(12) United States Patent
Candelore et al.

(10) Patent No.: US 11,451,854 B2
(45) Date of Patent: Sep. 20, 2022

(54) DONGLE TO CONVERT FORMATS TO ATSC 3.0 LOW POWER WIRELESS

(71) Applicant: Sony Corporation, Tokyo (JP)

(72) Inventors: Brant Candelore, Poway, CA (US); Fred Ansfield, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/147,781

(22) Filed: Jan. 13, 2021

(65) Prior Publication Data
US 2022/0224962 A1    Jul. 14, 2022

(51) Int. Cl.
| H04N 21/41 | (2011.01) |
| H04N 21/43 | (2011.01) |
| H04N 21/418 | (2011.01) |
| G06F 13/38 | (2006.01) |
| H04N 21/4363 | (2011.01) |

(52) U.S. Cl.
CPC ....... *H04N 21/4183* (2013.01); *G06F 13/382* (2013.01); *H04N 21/43637* (2013.01); *G06F 2213/0042* (2013.01)

(58) Field of Classification Search
CPC ......... H04N 21/4183; H04N 21/43637; H04N 1/00; H04N 19/00; H04N 19/10; H04N 19/20; H04N 19/30; H04N 19/40; H04N 19/42; H04N 19/44; H04N 7/01; H04N 7/015; H04N 7/20; G06F 13/382; G06F 2213/0042
See application file for complete search history.

(56) References Cited

U.S. PATENT DOCUMENTS

| 9,681,183 | B1* | 6/2017 | Majid | H04N 21/2221 |
| 2009/0276813 | A1* | 11/2009 | Bleiweiss | H04N 19/152 |
| | | | | 725/82 |
| 2011/0103472 | A1* | 5/2011 | Lefebvre | H04N 21/4122 |
| | | | | 375/E7.243 |
| 2011/0176602 | A1 | 7/2011 | Raveendran | |
| 2011/0216239 | A1 | 9/2011 | Raveendran | |
| 2012/0042102 | A1 | 2/2012 | Chung et al. | |
| 2012/0169925 | A1* | 7/2012 | Lai | H04N 21/4402 |
| | | | | 348/E7.003 |
| 2012/0230435 | A1 | 9/2012 | Kreiner | |
| 2014/0118468 | A1* | 5/2014 | Purdy | H04L 65/1083 |
| | | | | 348/14.08 |
| 2015/0135209 | A1* | 5/2015 | LaBosco | H04N 21/43615 |
| | | | | 725/31 |

FOREIGN PATENT DOCUMENTS

| CN | 202738038 U | 2/2013 |
| KR | 101582795 B1 | 1/2016 |

* cited by examiner

*Primary Examiner* — Alazar Tilahun
(74) *Attorney, Agent, or Firm* — John L. Rogitz

(57) ABSTRACT

Techniques are described for using the Advanced Television Systems Committee (ATSC) 3.0 television protocol and more specifically to a dongle that converts HDMI, USB, or VGA from a computer to ATSC 3.0 packets and wirelessly transmits the packets to a display.

20 Claims, 8 Drawing Sheets

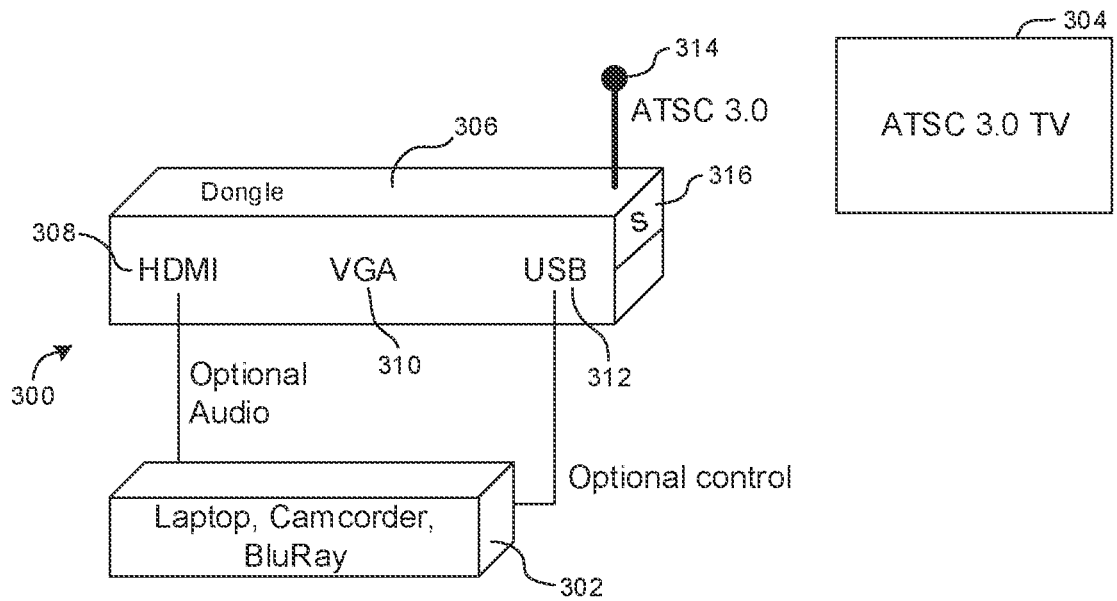
FIG. 3 HDMI-to-ATSC 3.0
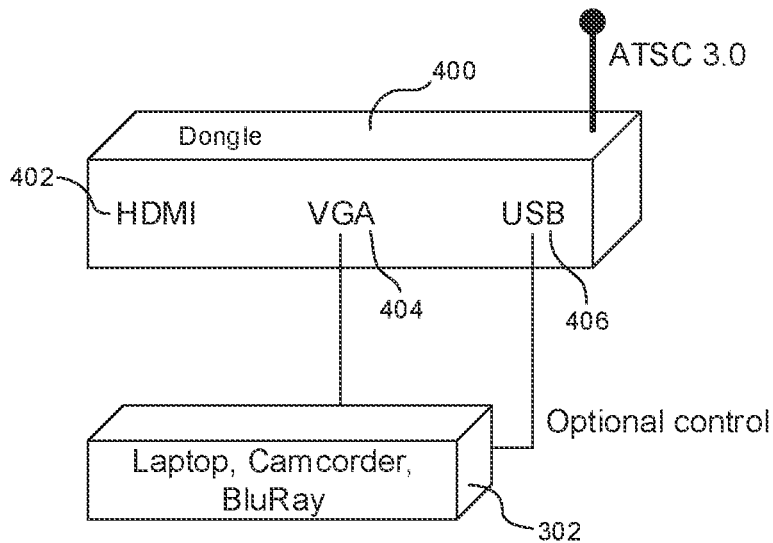
FIG. 4 VGA-to-ATSC 3.0

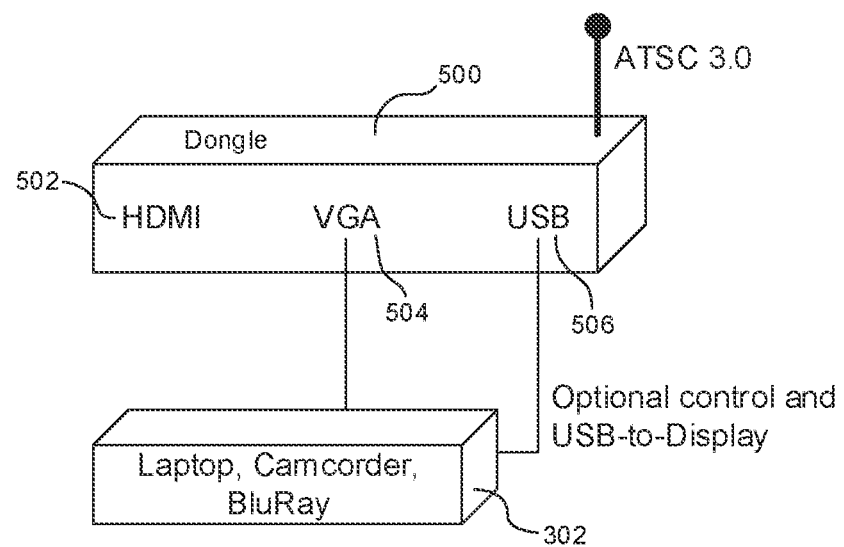
FIG. 5 USB-to-ATSC 3.0

US 11,451,854 B2

DONGLE TO CONVERT FORMATS TO ATSC 3.0 LOW POWER WIRELESS

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in ATSC A/300 for delivering the next generation of broadcast television. ATSC 3.0 supports delivery of a wide range of television services including, but not limited to, televised video, interactive services, non-real time delivery of data, and tailored advertising to a large number of receiving devices, from ultra-high-definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, people in a conference room may use a TV to display presentations that may be output from a laptop or other computer. As also understood herein, connecting the laptop to the TV using wires can be tedious and sometimes frustrating. Furthermore, data formats output by the laptop such as high-definition multimedia interface (HDMI) and video graphics array (VGA) use electrical signals that can be overloaded when driving long cables and that could cause a port to eventually be "blown".

Accordingly, a hardware-implemented dongle includes at least one non-advanced television systems committee (ATSC) 3.0 input configured to engage a source of content. The at least one input includes one or more of a universal serial bus (USB) input, a high-definition multimedia interface (HDMI) input, and a video graphics array (VGA) input. The dongle includes at least one conversion circuit configured for converting signals from the input to ATSC 3.0 signals. The dongle further includes at least one wireless transmitter configured to wirelessly transmit the ATSC 3.0 signals to at least one receiver for displaying the content from the source of content.

In accordance with present principles, HDMI can be received over USB (in Type-C "Alternate mode") rather than only by the physical HDMI port.

In some implementations the conversion circuit is configured to convert VGA signals to HDMI signals and convert the HDMI signals to ATSC 3.0 signals. The conversion circuit further may be configured to convert the HDMI signals to ATSC 3.0 signals at least in part by compressing the HDMI signals, and packetizing the HDMI signals.

In example embodiments the dongle includes circuitry configured to search at least a portion of ATSC 3.0 broadcast spectrum for a free channel and transmit the ATSC 3.0 signals on the free channel. The transmitter may include a pico transmitter transmitting at a power of no more than twenty milliwatts.

In another aspect, a digital TV assembly includes at least one digital TV and at least one source of content to be presented on the TV. The assembly also includes at least one dongle engageable with the source to convert content from the source to digital TV signals and wirelessly send the digital TV signals to the TV.

In another aspect, a method includes receiving, at a dongle, content in universal serial bus (USB) format, or high-definition multimedia interface (HDMI) format, or video graphics array (VGA) format. The method also includes converting, using the dongle, the content to advanced television systems committee (ATSC) 3.0 format, and using the dongle, wirelessly transmitting the content to an ATSC 3.0 TV.

The details of the present application, both as to its structure and operation, can best be understood in reference to the accompanying drawings, in which like reference numerals refer to like parts, and in which:

BRIEF DESCRIPTION OF THE DRAWINGS

FIG. 3 illustrates a dongle for converting high-definition multimedia interface (HDMI) data to digital TV signals;

FIG. 4 illustrates a dongle for converting video graphics array (VGA) data to digital TV signals;

FIG. 5 illustrates a dongle for converting universal serial bus (USB) data to digital TV signals;

DETAILED DESCRIPTION

Figure 1:
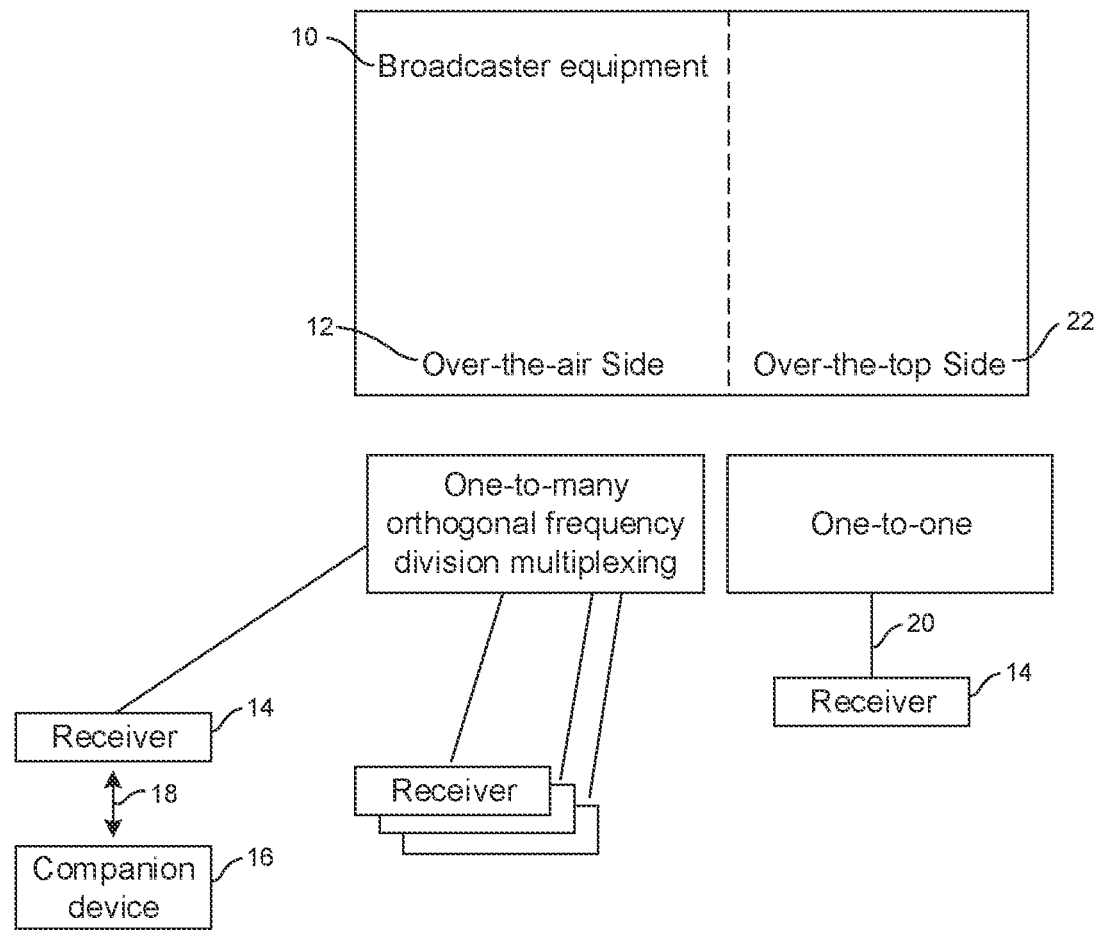
FIG. 1 is a block diagram of an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android©. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java©/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth©, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
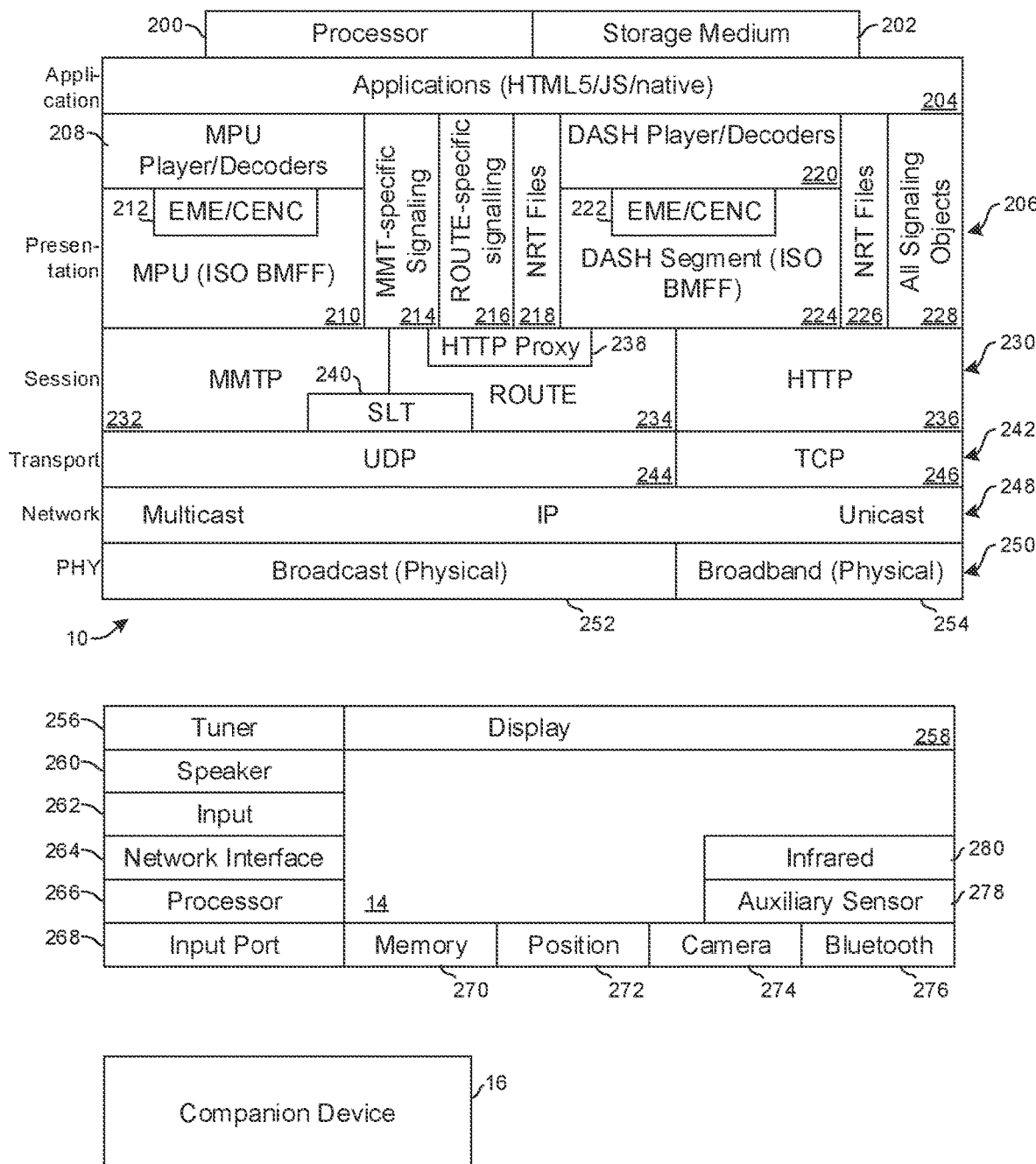
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements. Audio video (AV) streams are contained in ROUTE sessions. Layered coding transport (LCT) channels are setup within a ROUTE session. Each LCT channel carries either video or audio or captions or other data.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses user datagram protocol (UDP) 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile formatted data sent through the various protocols (HTTP/TCP/IP) in the protocol stack may be used on the broadband side. Media files in the DASH-IF profile formatted data based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g., communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high-definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g., receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g., all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth© transceiver 276 or other Near Field Communication (NFC) element for communication with other devices using Bluetooth© and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

FIG. 3 illustrates a system 300 with components that may have some or all of the components and techniques described above. A source 302 of audio-video (AV) content such as a laptop, camcorder, or disk player sends the content to a digital TV 304 such as an advanced television systems committee (ATSC) 3.0 TV via a hardware-implemented dongle 306 that can be engaged with the source 302 by plugging the dongle 306 into a port of the source 302. In the example shown, the dongle 306 includes a HDMI port 308 for receiving HDMI data from the source 302, a VGA port 310 for receiving VGA data from the source 302, and a USB port 312 for receiving and/or sending USB data from/to the source 302. The dongle 306 includes at least one antenna 314 for sending digital TV signals to the TV 304.

In the example of FIG. 3, the HDMI port 308 is shown communicating with the source 302 for receiving HDMI content therefrom. The VGA port 310 is not connected in FIG. 3, while the USB port 312 is connected to the source 302 for sending control signals to the source 302. In some embodiments the dongle 306 may include only the HDMI port 308, omitting the VGA port 310 and USB port 312, or only the HDMI port 308 and USB port 312, omitting the VGA port 310. The dongle 306 converts HDMI (video and audio) to digital TV packets such as ATSC 3.0 Internet Protocol (IP) packets, sending the digital TV signal wirelessly to the TV 304 using pico transmission power. Pico transmission power refers to a transmission power in the milliwatt range, e.g., no more than twenty milliwatts, or no more than fifty milliwatts, or no more than 100 milliwatts, or no more than five milliwatts. Thus, the wireless signal can be used by the TV 304 in the same room as the source 302 but generally is too weak to escape the building in which the TV 304 is located, although potentially strong enough to propagate across drywall into another conference room.

The dongle 306 may include a hardware switch 316 to select the channel over which the data from the source 302 is sent to the TV 304, typically channel 3 or channel 4. Or the channel may be selected via the USB port 312 interface. Content may be sent to the TV 304 in the clear or encrypted. If the content is encrypted, then digital rights management (DRM) is invoked on the ATSC 3.0 signal. Also, recognizing that ATSC 3.0 uses AC4 audio, HDMI audio is converted to AC4 audio.

FIG. 4 illustrates a dongle 400 that in all essential respects is identical in configuration and operation to the dongle 306 shown in FIG. 3, with the following exceptions. The dongle 400 shown in FIG. 4 includes a HDMI port 402 for receiving HDMI data from the source 302, a VGA port 404 for receiving VGA data from the source 302, and a USB port 406 for receiving and/or sending USB data from/to the source 302.

In the example of FIG. 4, the VGA port 404 is shown communicating with the source 302 for receiving VGA content therefrom. The HDMI port 402 is not connected in FIG. 4, while the USB port 406 is connected to the source 302 for sending control signals to the source 302. In some embodiments the dongle 400 may include only the VGA port 404, omitting the HDMI port 402 and USB port 406, or only the VGA port 404 and USB port 406, omitting the HDMI port 402.

The dongle 400 converts VGA to digital TV packets such as ATSC 3.0 Internet Protocol (IP) packets, sending the digital TV signal wirelessly to the TV 304 using pico transmission power. There is no audio with VGA. Analog audio input is an option, encoded as AC-4.

FIG. 5 illustrates a dongle 500 that in all essential respects is identical in configuration and operation to the dongle 306 shown in FIG. 3, with the following exceptions. The dongle 500 shown in FIG. 5 includes a HDMI port 502 for receiving HDMI data from the source 302, a VGA port 504 for receiving VGA data from the source 302, and a USB port 506 for receiving and/or sending USB data from/to the source 302.

In the example of FIG. 4, the USB port 506 is shown communicating with the source 302 for receiving USB content therefrom. The HDMI port 502 and VGA port 504 are not connected in FIG. 5, while the USB port 506 is connected to the source 302 for sending control signals to the source 302 in addition to receiving USB AV data therefrom. In some embodiments the dongle 500 may include only the USB port 506, omitting the HDMI port 502 and VGA port 504.

The dongle 500 converts USB AV data from the source 302 to digital TV signals and sends the AV data to the TV 304.

Figure 6:
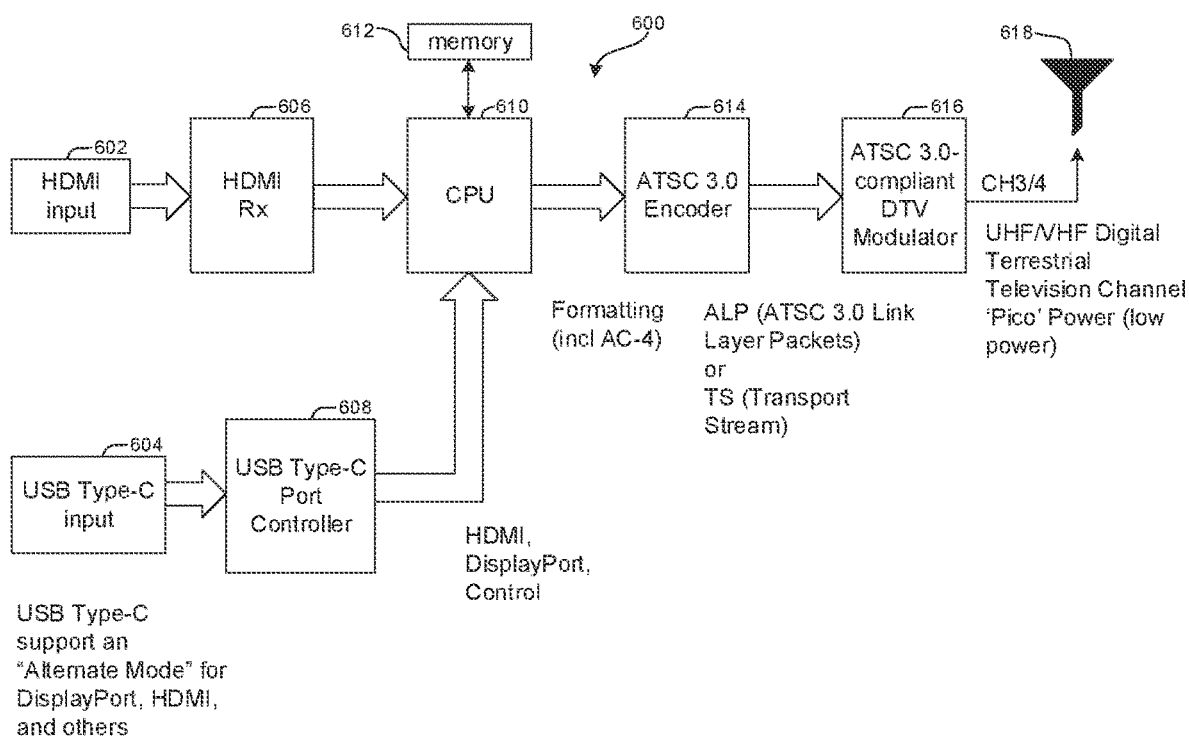
FIG. 6 illustrates details of an example dongle.

FIG. 6 illustrates components of an example dongle 600 that has no VGA capability in the non-limiting example shown. Components in the dongle 600 shown in FIG. 6 may be incorporated in any of the dongles described herein.

The dongle 600 includes a HDMI input port 602 and a USB input port 604. The USB input port 604 may be a type-C port that supports "alternate mode" for Display Port, HDMI, and others.

A HDMI receiver 606 receives HDMI from the HDMI port 602, while a USB controller 608 such as a type-C port controller communicates with the USB port 604.

The HDMI receiver 606 and USB controller 608 communicate with at least one processor 610 such as a central processing unit (CPU) accessing at least one computer memory 612, which may be implemented as solid state or disk-based storage. The processor 610 communicates with a digital TV encoder 614 such as an ATSC 3.0 controller, which in turn sends signals to a modulator 616 such as an ATSC 3.0-compliant digital TV modulator for transmission (over, e.g., channel 3 or channel 4) over an antenna 618.

Figure 7:
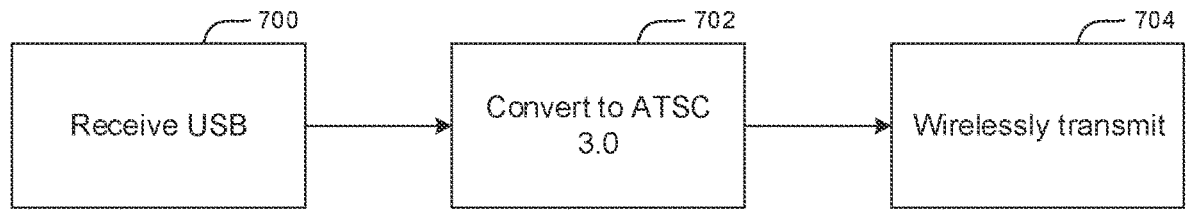
FIG. 7 illustrates example logic in example flow chart format for sending USB data to a digital TV.

FIG. 7 illustrates USB-to-digital TV conversion logic that may be implemented by a dongle herein consistent with present principles. Commencing at block 700, USB AV data is received from, e.g., the source 302 shown in FIG. 3, and converted to digital TV format such as ATSC 3.0 format at block 702. The AV data is transmitted wirelessly at block 704 to, e.g., the TV 304 shown in FIG. 3.

Figure 8:
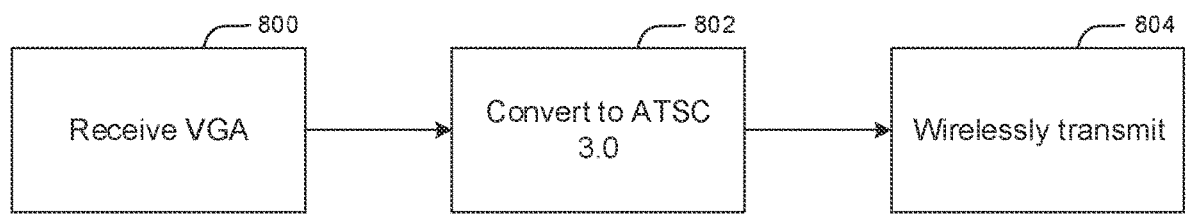
FIG. 8 illustrates example logic in example flow chart format for sending VGA data to a digital TV.

FIG. 8 illustrates VGA-to-digital TV conversion logic that may be implemented by a dongle herein consistent with present principles. Commencing at block 800, VGA AV data is received from, e.g., the source 302 shown in FIG. 3, and converted to digital TV format such as ATSC 3.0 format at block 802. The AV data is transmitted wirelessly at block 804 to, e.g., the TV 304 shown in FIG. 3.

Figure 9:
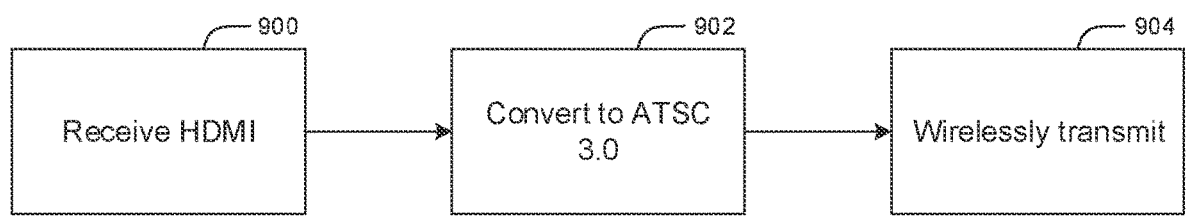
FIG. 9 illustrates example logic in example flow chart format for sending HDMI data to a digital TV.

FIG. 9 illustrates HDMI-to-digital TV conversion logic that may be implemented by a dongle herein consistent with present principles. Commencing at block 900, HDMI AV data is received from, e.g., the source 302 shown in FIG. 3, and converted to digital TV format such as ATSC 3.0 format at block 902. The AV data is transmitted wirelessly at block 904 to, e.g., the TV 304 shown in FIG. 3.

Figure 10:
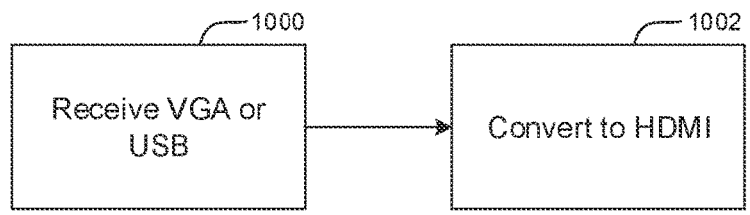
FIG. 10 illustrates example logic in example flow chart format for first converting VGA or USB data to HDMI.

FIG. 10 illustrates intermediate logic for converting USB or VGA to digital TV format. At block 1000, the USB data or VGA data is received, then converted to HDMI format at block 1002.

Figure 11:
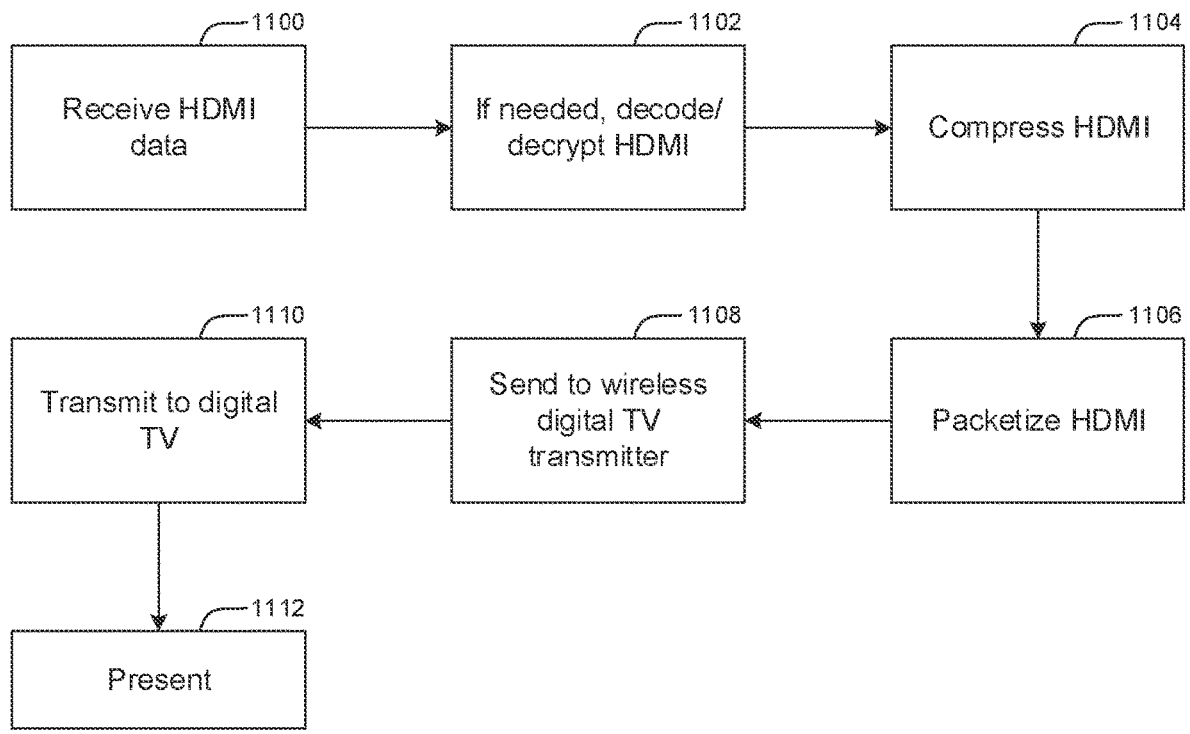
FIG. 11 illustrates example logic in example flow chart format for converting HDMI data to digital TV signals.

FIG. 11 illustrates ensuing logic that may be used either when HDMI is received directly from, e.g., the source 302 shown in FIG. 3 or when HDMIU is produced from original VGA or USB data as illustrated in FIG. 11. The HDMI data is received at block 1100 typically non-compressed. If needed, the HDMI data may be decoded or decrypted at block 1102. From block 1100 or from block 1102 when used, at block 1104 the dongle compresses the HDMI.

Proceeding to block 1106, the HDMI is packetized into IP format to configure it in digital TV (e.g., ATSC 3.0) format. The digital TV-formatted AV is sent to a wireless transmitter at block 1108, which transmits the signal at block 1110 to a TV for presentation of the AV on the TV at block 1112.

Note that signaling may be inserted in the stream for the TV to properly tune and bootstrap acquisition of the one of ten channels. One dongle-to-one TV may be used, but if there is no concern about privacy, the password can be turned off and content from the source 302 may be presented on multiple TVs (one dongle-to-many TVs).

Figure 12:
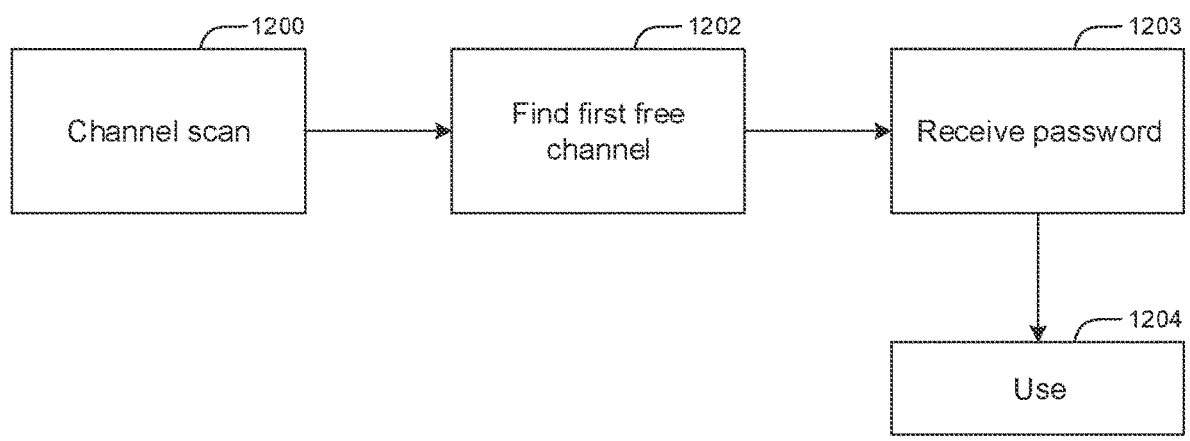
FIG. 12 illustrates example logic in example flow chart format for establishing a channel between the source and the TV.
Figure 13:
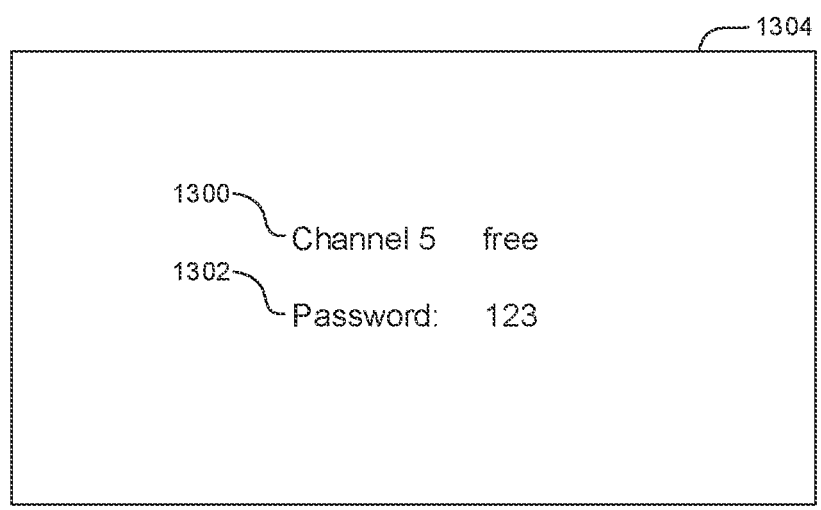
FIG. 13 illustrates an example screen shot consistent with FIG. 12.

FIGS. 12 and 13 illustrate further. Commencing at block 1200, in one embodiment a channel scan may be conducted by any of the dongles herein. The first free channel to be identified during the scan may be selected at block 1202. A password may be received at block 1203 which, if correct, can cause the dongle to transmit the signal to the TV at block 1204 over the channel identified at block 1202.

FIG. 13 illustrates an example screen shot consistent with FIG. 12. The dongle may cause the TV 304 shown in FIG. 3 to present at 1300 an indication of the channel located at block 1202 in FIG. 12. The dongle may also cause the TV to present at 1304 a password such as a random password. The source 302 may include a control application for the dongle, and a person viewing the TV and operating the source 302 opens the control app, selects the channel indicated at 1300, and inputs the password indicated at 1302. Only the people in the same room as the source 302 and TV 304 see the password to input. The password may be used to encrypt the wirelessly transmitted signal to the TV. For example, advanced encryption standard (AES) that uses 128-bit keys may be employed, and the password key can be hashed to 128-bits. The display/presentation app can apply the password key directly to the AES encryption hardware. Other DRM can be ignored (not used) for this particular problem because the expected key needs to be generated by the TV in order to make it unique and only available to those in the conference room.

The methods described herein may be implemented as software instructions executed by a processor, suitably configured application specific integrated circuits (ASIC) or field programmable gate array (FPGA) modules, or other manner. Where employed, the software instructions may be embodied in a non-transitory device such as a CD ROM or Flash drive. The software code instructions may alternatively be embodied in a transitory arrangement such as a radio or optical signal, or via a download over the Internet.

It will be appreciated that whilst present principals have been described with reference to some example embodiments, these are not intended to be limiting, and that various alternative arrangements may be used to implement the subject matter claimed herein.

What is claimed is:

1. A hardware-implemented dongle comprising:
   at least one non-advanced television systems committee (ATSC) 3.0 input configured to engage a source of content, the at least one input comprising at least one of: a universal serial bus (USB) input, a high-definition multimedia interface (HDMI) input, a video graphics array (VGA) input;
   at least one conversion circuit configured for converting signals from the input to ATSC 3.0 signals; and
   at least one wireless transmitter configured to wirelessly transmit the ATSC 3.0 signals to at least one receiver for displaying the content from the source of content.

2. The dongle of claim 1, wherein the at least one input comprises a USB input.

3. The dongle of claim 1, wherein the at least one input comprises a HDMI input.

4. The dongle of claim 1, wherein the at least one input comprises a VGA input.

5. The dongle of claim 2, wherein the at least one input comprises a HDMI input.

6. The dongle of claim 5, wherein the at least one input comprises a VGA input.

7. The dongle of claim 1, wherein the conversion circuit is configured to:
convert VGA signals to HDMI signals and convert the HDMI signals to ATSC 3.0 signals.

8. The dongle of claim 7, wherein the conversion circuit is configured to convert the HDMI signals to ATSC 3.0 signals at least in part by:
compressing the HDMI signals;
packetizing the HDMI signals.

9. The dongle of claim 1, comprising circuitry configured to:
search at least a portion of ATSC 3.0 broadcast spectrum for a free channel; and
transmit the ATSC 3.0 signals on the free channel.

10. The assembly of claim 1, wherein the at least one input comprises a VGA input.

11. A hardware-implemented dongle comprising:
at least one non-advanced television systems committee (ATSC) 3.0 input configured to engage a source of content, the at least one input comprising at least one of: a universal serial bus (USB) input, a high-definition multimedia interface (HDMI) input, a video graphics array (VGA) input;
at least one conversion circuit configured for converting signals from the input to ATSC 3.0 signals; and
at least one wireless transmitter configured to wirelessly transmit the ATSC 3.0 signals to at least one receiver for displaying the content from the source of content, wherein the transmitter comprises a pico transmitter transmitting at a power of no more than twenty milliwatts.

12. A digital TV assembly comprising:
at least one digital TV;
at least one source of content to be presented on the TV; and
at least one dongle engageable with the source to convert content from the source to Advanced Television systems Committee (ATSC) signals and wirelessly send the ATSC signals to the TV, wherein the dongle comprises:
at least one non-digital TV input configured to engage the source of content, the at least one input comprising at least one of: a universal serial bus (USB) input, a high-definition multimedia interface (HDMI) input, a video graphics array (VGA) input;
at least one conversion circuit configured for converting signals from the input to ATSC signals; and
at least one wireless transmitter configured to wirelessly transmit the ATSC signals to the digital TV for displaying the content from the source of content.

13. The assembly of claim 12, wherein the at least one input comprises a USB input.

14. The assembly of claim 12, wherein the at least one input comprises a HDMI input.

15. The assembly of claim 12, wherein the conversion circuit is configured to:
convert VGA signals to HDMI signals and convert the HDMI signals to ATSC signals.

16. The assembly of claim 15, wherein the conversion circuit is configured to convert the HDMI signals to ATSC signals at least in part by:
compressing the HDMI signals;
packetizing the HDMI signals.

17. The assembly of claim 12, comprising circuitry configured to:
search at least a portion of a broadcast spectrum for a free channel; and
transmit the ATSC signals on the free channel.

18. The assembly of claim 12, wherein the ATSC signals comprise ATSC 3.0 signals.

19. A digital TV assembly comprising:
at least one digital TV;
at least one source of content to be presented on the TV; and
at least one dongle engageable with the source to convert content from the source to digital TV signals and wirelessly send the digital TV signals to the TV, wherein the transmitter comprises a pico transmitter transmitting at a power of no more than twenty milliwatts.

20. A method, comprising:
receiving, at a dongle, content in universal serial bus (USB) format, or high-definition multimedia interface (HDMI) format, or video graphics array (VGA) format;
converting, using the dongle, the content to advanced television systems committee (ATSC) 3.0 format; and
using the dongle, wirelessly transmitting the content to an ATSC 3.0 TV.

* * * * *